United States Patent
Platania et al.

(10) Patent No.: US 9,276,469 B2
(45) Date of Patent: Mar. 1, 2016

(54) DC-DC CONVERTER FOR THE CONTROL OF A BATTERY CHARGE CURRENT IN PORTABLE ELECTRONIC DEVICES

(75) Inventors: Giuseppe Platania, Catania (IT); Vincenzo Polisi, Catania (IT); Patrizia Milazzo, Catania (IT)

(73) Assignee: ST-ERICSSON SA, Plan-les-Ouates (CH)

( * ) Notice: Subject to any disclaimer, the term of this patent is extended or adjusted under 35 U.S.C. 154(b) by 1051 days.

(21) Appl. No.: 13/320,219

(22) PCT Filed: Apr. 13, 2010

(86) PCT No.: PCT/EP2010/054790
§ 371 (c)(1),
(2), (4) Date: Feb. 21, 2012

(87) PCT Pub. No.: WO2010/130514
PCT Pub. Date: Nov. 18, 2010

(65) Prior Publication Data
US 2012/0187921 A1 Jul. 26, 2012

(30) Foreign Application Priority Data
May 11, 2009 (IT) .............................. MI2009A0790

(51) Int. Cl.
H02J 7/06 (2006.01)
H02M 3/158 (2006.01)
(52) U.S. Cl.
CPC .................................... H02M 3/158 (2013.01)
(58) Field of Classification Search
CPC ............... H02J 7/022; H02J 7/0093
USPC ............................... 320/140, 141, 159
See application file for complete search history.

(56) References Cited

U.S. PATENT DOCUMENTS

2002/0140591 A1 10/2002 Laaser
2009/0058363 A1* 3/2009 Platania et al. ............... 320/134

FOREIGN PATENT DOCUMENTS

EP 2031745 A 3/2009

OTHER PUBLICATIONS

Patent Cooperation Treaty International Search Report and Written Opinion of PCT/EP2010/054790; Jul. 19, 2010; 13 pages.
Ministero dello Sviluppo Economico; Rapporto Di Ricerca and Opinione Scritta; Italian Search Report and Written Opinion; Karl-Rudolf Zettler; Dec. 9, 2009; 10 pages.

* cited by examiner

*Primary Examiner* — Edward Tso
*Assistant Examiner* — Aaron Piggush
(74) *Attorney, Agent, or Firm* — Howison & Arnott, LLP

(57) ABSTRACT

A DC-DC converter controls a supply current ($I_{IN}$) provided to a rechargeable battery. The converter comprises an electrical input terminal that receives supply current ($I_{IN}$). An electrical output terminal is connected to the battery through a coil with a resistor in series therebetween. A controllable selector connects the input terminal to the output terminal during a first time interval in order to supply the battery and to connect the input terminal to a ground potential during a successive second time interval. Also, a feedback module generates a control signal for the selector from a resistor feedback signal, indicative of a variation of a battery charge current ($I_{OUT}$). The feedback module has an electronic block that receives the feedback signal. The electronic block processes the feedback signal to measure a variation of the supply current ($I_{IN}$) and provide the control signal to adjust the duration of the first time interval.

18 Claims, 4 Drawing Sheets

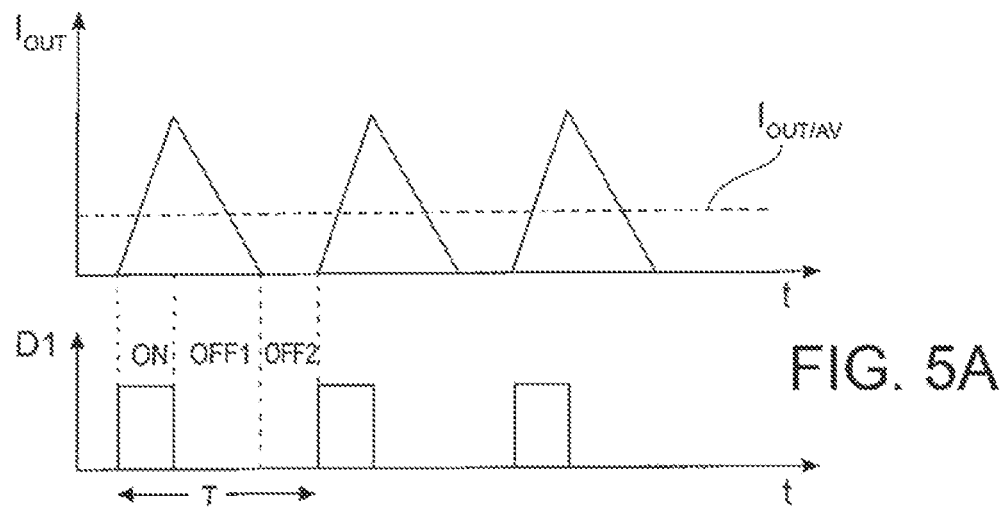
FIG. 5A
FIG. 5B
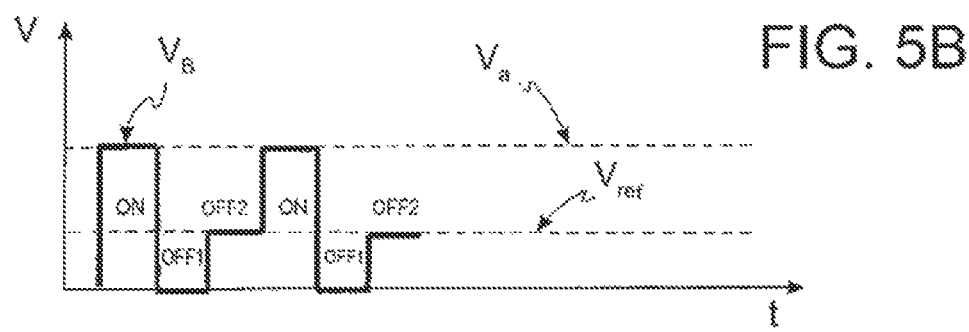
FIG. 5C
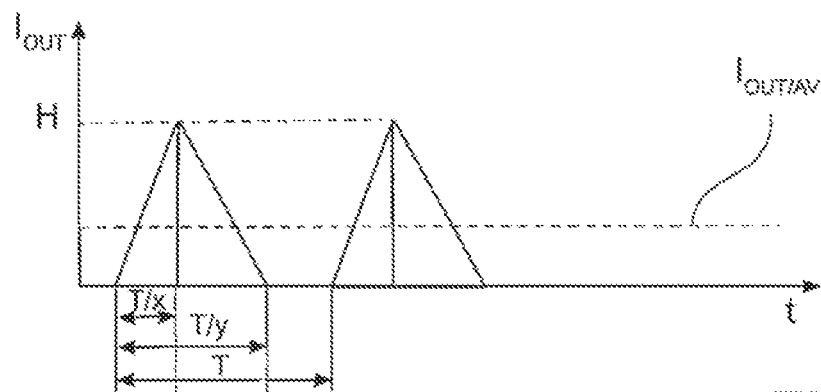
FIG. 5D

DC-DC CONVERTER FOR THE CONTROL OF A BATTERY CHARGE CURRENT IN PORTABLE ELECTRONIC DEVICES

CROSS-REFERENCE TO RELATED APPLICATIONS

This application is a U.S. National Phase application submitted under 35 U.S.C. §371 of Patent Cooperation Treaty application serial no. PCT/EP2010/054790, filed Apr. 13, 2010, and entitled DC-DC CONVERTER FOR THE CONTROL OF A BATTERY CHARGE CURRENT IN PORTABLE ELECTRONIC DEVICES, which application claims priority to Italy patent application serial no. MI2009A000790, filed May 11, 2009, and entitled DC-DC CONVERTER FOR THE CONTROL OF A BATTERY CHARGE CURRENT IN PORTABLE ELECTRONIC DEVICES.

Patent Cooperation Treaty application serial no. PCT/EP2010/054790, published as WO 2010/130514, and Italy patent application serial no. MI2009A000790, are incorporated herein by reference.

TECHNICAL FIELD

The present invention relates to a DC-DC converter, particularly of the voltage reducer type (step-down converter or buck converter), for the control of a charge current provided to a battery in a portable device, and more particularly relative to the use of a USB (Universal Serial Bus) interface for the interconnection of the above-mentioned portable device, which is battery-supplied, to other devices

BACKGROUND

During the last years, battery-supplied portable electronic devices, such as mobile phones, digital cameras, digital video cameras, palm devices (PDA, Personal Digital Assistant) have had an increasing diffusion among users.

The success achieved by USB interfaces as connection means of personal computers (PCs) to other peripherals, such as, for example, printers, keyboards, pointing devices, memory card readers, and mass storage supports (pen drives), has induced consumer electronic devices manufacturers to provide also portable devices with such USB interfaces.

In fact, due to the growing number of multimedia functions and applications present in the portable devices which determine a high current consumption, it is necessary to frequently recharge the batteries of such devices. The USB connection ensures that such recharge occurs in a rapid manner, exploiting other portable devices.

However, a problem which is found in recharging a portable device battery by means of a USB connection is the difficulty in effectively controlling a supply current provided to the battery from the exterior through the USB connector, to prevent that such current exceeds maximum values allowed by the USB connection itself.

In order to obviate such drawback, a known solution employs a DC-DC converter having an input terminal connected to the USB connector, and provided with current detection devices associated to such input terminal. On the basis of the information provided by the above-mentioned detection devices, the converter is capable of controlling any variations from preset values of the external supply current provided to the portable device through the USB connector. Similar detection devices associated to an output terminal of the converter allow to control also variations of a charge current provided to the battery to be recharged.

However, such DC-DC converter of the known type comprises a number of discrete circuitry components which often make it too bulky and unsuitable for applications to portable devices in which, on the contrary, there is a tendency towards miniaturization and integration of the different components in order to reduce the implementation costs thereof. Furthermore, the functioning of such a DC-DC converter implies high power dissipation, which is unacceptable in many applications.

SUMMARY

Embodiments of the present invention provide an electronic DC-DC converter, particularly of the voltage reducer type (step-down converter), for the control of the supply current provided from the exterior to the battery through the USB connector in portable electronic devices, which is alternative to the known type converters and allows at least partially obviating the drawbacks set forth above.

BRIEF DESCRIPTION OF THE DRAWINGS

Further characteristics and advantages of the above-mentioned electronic converter will result from the description reported herein below, of an exemplary embodiment, given by way of indicative, non-limiting example, with reference to the annexed figures, in which:

FIGS. 5A and 5B show by way of example, against time, waveforms of a charge current and a duty-cycle signal relative to the electronic converter of FIG. 2, respectively, in a discontinuous conduction mode;

FIG. 5C shows by way of example, against time, waveforms of voltage signals relative to the components unit of FIG. 3 in a discontinuous conduction mode;

FIG. 5D shows a detail of two successive periods of the waveform of FIG. 5A.

DETAILED DESCRIPTION

Figure 1:
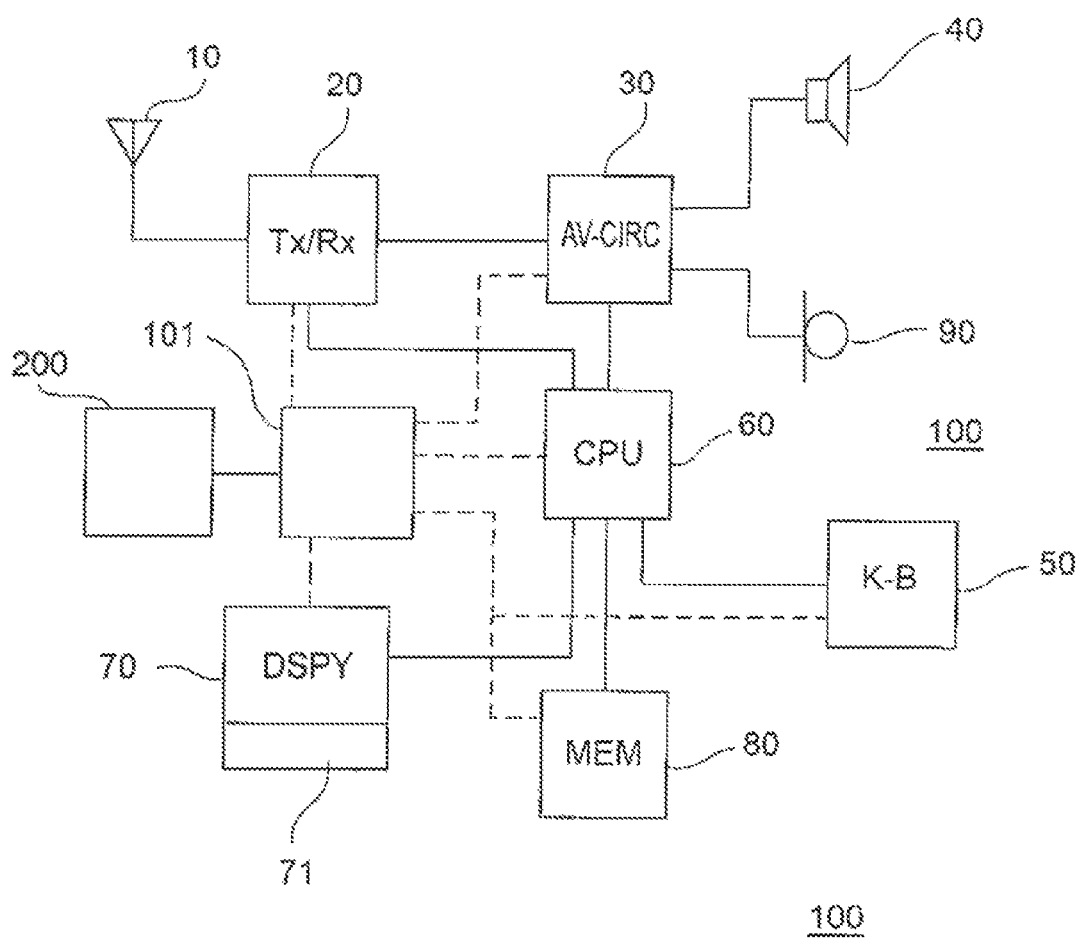
FIG. 1 schematically shows a battery-supplied portable electronic device.

FIG. 1 schematically shows an electronic device 100, preferably of the portable type, including a DC-DC converter 200 in accordance with an embodiment of the invention. The electronic device 100 illustrated in FIG. 1 is, for example, a mobile phone, but in accordance with further embodiments of the invention, such device 100 can be a palm device (Personal Digital Assistant, or PDA), a portable MP3 file player, a digital camera, a digital video camera, a portable computer (for example, a notebook or a netbook).

The mobile phone 100 comprises a plurality of electronic components connected to a rechargeable battery 101 to receive a suitable supply current. This is schematically indicated in FIG. 1 by means of dashed lines. Furthermore, as shown in the above-mentioned FIG. 1, the DC-DC converter 200 under discussion is electrically connected to the battery 101.

In more detail, the mobile phone 100 comprises an antenna 10, a transceiver unit 20 (Tx/Rx) connected to the antenna 10, and an audio unit 30 (AV-CIRC) connected to the transceiver unit 20. A loudspeaker 40 and a microphone 90 are connected to such audio unit 30 of the phone 100. Furthermore, the mobile phone 100 is provided with a central processing unit (CPU) 60 for the control of various telephone and multimedia functions of the device, and especially for the control of the functioning of the transceiver unit 20 and the audio unit 30 on the basis of a control program stored in a system memory 80 (MEM), connected to the CPU 60. Furthermore, the mobile phone 100 is provided with a display 70 provided with a screen 71 (for example, a liquid crystal display, DSPY) and a user interface 50, such as an alphanumeric keyboard (K-B).

Figure 2:
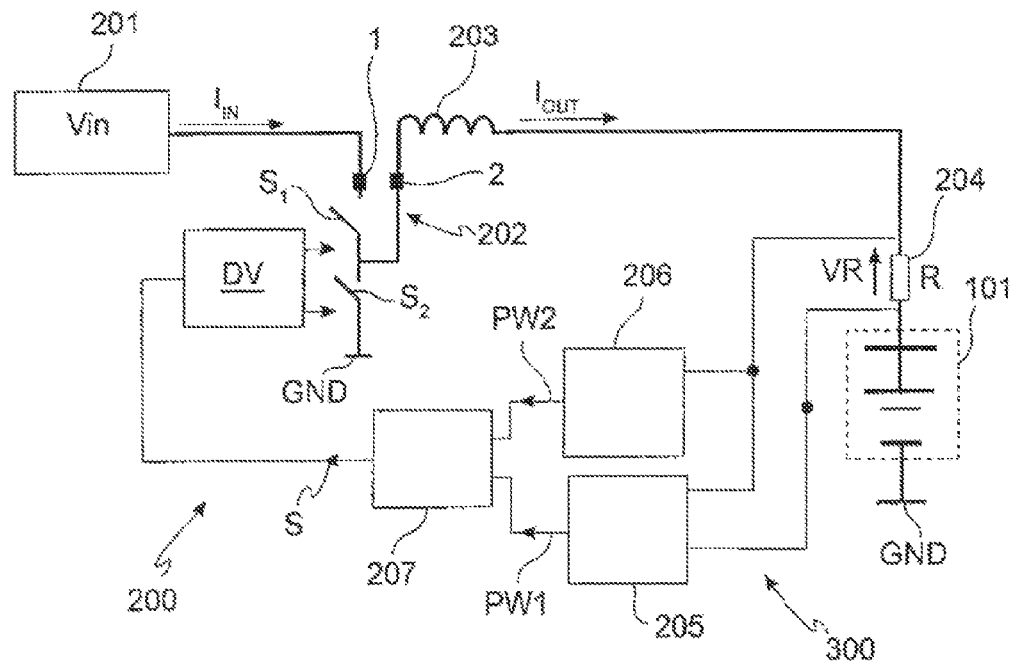
FIG. 2 schematically shows an electronic DC-DC converter for the control of the battery charge current of the device in FIG. 1.

With reference to FIG. 2, an exemplary embodiment of an innovative electronic DC-DC converter for the control of the charge current of a battery in a portable device, such as, for example, the battery 101 of the above-mentioned mobile phone 100, has been indicated with 200. Such electronic converter 200 is, for example, a step-down converter.

The step-down DC-DC converter 200 is connected between the battery 101 to be recharged and a connector 201, of the USB (Universal Serial Bus) type, which is connected to an external supply voltage source $V_{in}$. Particularly, the converter 200 comprises an electrical input terminal 1 connected to the supply source $V_{in}$ to receive a supply current $I_{IN}$ from the exterior of the portable device 100. For example, such external supply voltage $V_{in}$ can be provided by an external computer, of the desktop or laptop type, or by any device which is connectable to the portable device 100 by a USB connection.

With reference to FIG. 2, the step-down DC-DC converter 200 further comprises an electrical output terminal 2 connected to the battery 101 to be recharged by means of a coil 203 and a sense resistor 204 mutually connected in series. It shall be noticed that the coil 203 and the sense resistor 204 are discrete circuitry components, that is, they are not integrated on a chip of semiconductor material.

In addition, the converter 200 comprises a controlled selector 202 including a first S1 and a second S2 switches, which are controlled by a circuitry control block DV. Such controlled selector operates so as to selectively connect/disconnect the input terminal 1 to the output terminal 2, that is, to selectively connect/disconnect the battery 101 to be recharged to/from the external supply voltage $V_{in}$. The first S1 and the second S2 switches are a PMOS transistor and a NMOS transistor, operating pull-push so as to not be both disabled at the same time, that is, open circuits.

In more detail, the controlled selector 202 is configured so that, both said first S1 and second S2 switches being active, that is, short circuits, the external supply voltage $V_{in}$ is short-circuited toward a reference potential, for example, the ground potential GND, thus isolating the battery 101. Vice versa, with only the first one S1 of such switches being short-circuited, the battery 101 is connected to the external supply voltage $V_{in}$ through the coil 203 and the sense resistor 204.

The sense resistor 204 is employed to detect the value of a charge current $I_{OUT}$ flowing within the coil 203. Such charge current $I_{OUT}$ is adapted to recharge the battery 101. The sense resistor 204 includes a discrete resistor 204 of about 100 mΩ.

A voltage VR taken at the sense resistor 204 leads is proportional to an average value of the charge current $I_{OUT}$, and represents a feedback voltage signal to be processed and sent, on a feedback branch of the DC-DC converter 200, to drive the circuitry control block DV.

In particular, the feedback branch of the DC-DC converter 200 includes a feedback module 300 adapted to generate a control signal S from the feedback signal VR. Such control signal S is sent to the control block DV in order to control the first S1 and the second S2 switches. Preferably, the feedback module 300 includes, on the whole, integrated circuits.

Figure 4A:
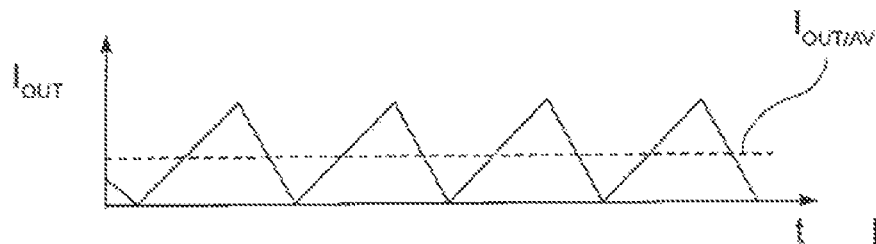
FIGS. 4A, 4B, and 4C show by way of example, against time, waveforms of a charge current, an input current, and a duty-cycle signal relating to the electronic converter of FIG. 2, respectively, in a continuous conduction mode.

FIG. 4A shows, by way of example, a waveform of the current present in the coil 203 of the step-down DC-DC converter 200 against time (solid line curve) in a continuous conduction mode. Such coil 203 current coincides with the battery 101 charge current $I_{OUT}$. The alternate trend of such charge current $I_{OUT}$ depends on the connection/disconnection states of the coil 203 from the input voltage source $V_{in}$ through the selector 202. An average value $I_{OUT/AV}$ of such charge current is represented by the dashed line of FIG. 4A.

Figure 4B:
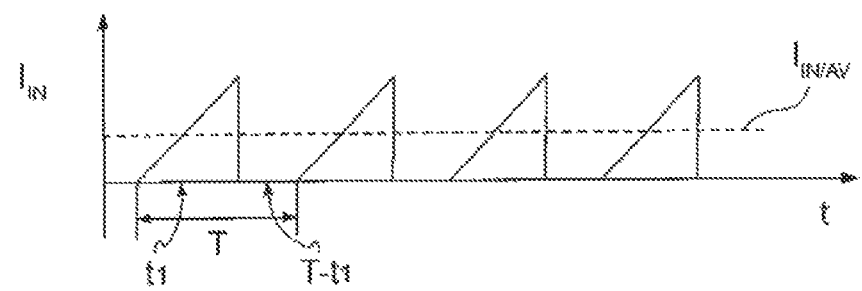

FIG. 4B shows, by way of example, a waveform of the supply or input current $I_{IN}$ (solid line curves) of the step-down converter 200 against time in a continuous conduction mode. In each period T of the signal, the waveform of the input current $I_{IN}$ comprises a pulse which is determined by the concomitant closure (ON) of the first switch S1 and by the opening (OFF) of the second switch S2 during a first time interval t1. In a successive time interval T-t1, the first switch S1 is open (OFF), while the second switch S2 is closed (ON), so that the input current $I_{IN}$ is null. An average value $I_{IN/AV}$ of such input current $I_{IN}$ is represented by the dashed line of FIG. 4B.

The feedback electronic module 300 of the converter 200 includes a first 205 and a second 206 processing blocks which are adapted to receive and process the voltage signal VR taken at the sense resistor 204 heads. Such first 205 and second 206 blocks have their respective input terminals connected in parallel one to the other, and to the sense resistor 204 heads. The outputs of such blocks 205, 206 are connected to a logic block input 207 which is implemented, for example, by a digital port AND which is known to those skilled in the art. Particularly, such logic block 207 is adapted to receive a first PW1 and a second PW2 signals, respectively, from such first 205 and second 206 blocks, each of which is generated by processing the feedback voltage signal VR. Preferably, such first PW1 and second PW2 signals are pulse-width (PWM) modulated signals, and in phase one to the other.

It shall be noted that the logic block 207 operates so as to select one or the other of such first PW1 and second PW2 signals to be sent to the circuitry control block DV in order to control the opening/closure of the above-mentioned first S1 and second S2 switches. Advantageously, the logic block 207 operates so as to select the one of the two signals PW1 and PW2 having a respective duty cycle which is lesser than that of the other one.

Figure 3:
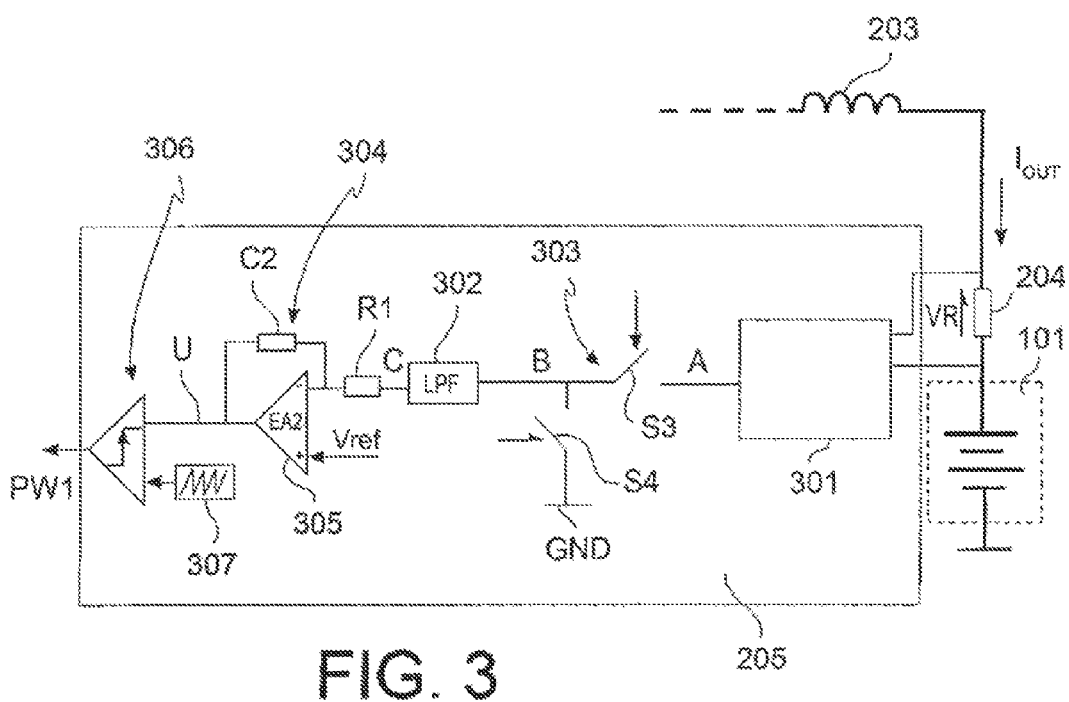
FIG. 3 shows in detail a structure of a block of electronic components included in the electronic converter of FIG. 2.

FIG. 3 shows in detail the circuitry structure of the first block 205 on the whole. The same or similar members and components to those shown in the previous figures are indicated in FIG. 3 with the same reference numerals.

In particular, such first block 205 comprises a voltage-voltage module converter 301 so configured as to receive the feedback voltage VR, which is indicative of the average charge current $I_{OUT/AV}$, at the input terminals. Such first block is adapted to make available an output, on a respective first terminal A, a first voltage signal $V_A$ with constant width which can be calculated based on the relationship:

$$V_A = G \cdot I_{OUT/AV} \cdot R \qquad (1)$$

where G is the converter 301 gain, and R is the resistance value 204.

It shall be noted that the above-mentioned first terminal A of the converter 301 is connectable in series to a second input terminal B to a filter 302, preferably a low pass filter, by means of a further controlled selector 303. Such further selector 303 comprises a third S3 and a fourth S4 switches, which are controlled in order to selectively connect and disconnect the converter 301 to the/from the filter 302. In particular, the selector 303 is a three-stage selector operating so that, when the third switch S3 only is active (a short circuit), the converter 301 is directly connected to the filter 302, that is, the voltage $V_A$ on the first output terminal A is made available on the second input terminal B to the filter 302. Instead, in the case where only the fourth switch S4 is short-circuited, the filter 302 input terminal B is connected to the reference ground potential GND, and the converter 301 is disconnected from the filter 302. Finally, in the case where both the switches S3 and S4 are disabled (open circuits), the terminals A and B continue to be floating.

Furthermore, the above-mentioned low pass filter 302 is connected in series with an integrator circuit 304 which employs a feedbacked operational amplifier 305 known to those skilled in the art. Particularly, an inverting terminal of the amplifier 305 is connected to a respective output terminal C of the filter 302, by interposition of a first reactance R1. A further output terminal U of the integrator 304 is connected to said inverting terminal through a second reactance C2. Furthermore, the amplifier 305 is adapted to receive a reference voltage $V_{ref}$ at a respective not-inverting terminal.

Advantageously, such reference voltage $V_{ref}$ is made variable in order to adjust the value of the input current $I_{IN}$ of the step-down converter 200.

The integrator 304 output U is connected to an inverting input of an operational amplifier PWM 306, the respective not-inverting input of which is connected to a sawtooth wave signal generator 307. It shall be noted that the first pulse-width modulated signal PW1 is made available at the amplifier PWM 306 output.

It shall be noted that the structure of the second block 206 is substantially similar to that of the first block 205, even if it is free from of the selector 303. In other words, the converter 301 and the low pass filter 302 are directly connected one to the other.

A functioning example of the step-down DC-DC converter 200 of the invention in a continuous conduction mode can be described with reference to FIGS. 4A-4E.

Particularly, a constant voltage $V_A$ related to the average charge current $I_{OUT/AV}$ of the battery 101 on the basis of the relation (1) is present on the first output terminal A from the voltage-voltage converter 301. Such constant voltage $V_A$ is shown in FIG. 4D (dashed line).

Figure 4C:
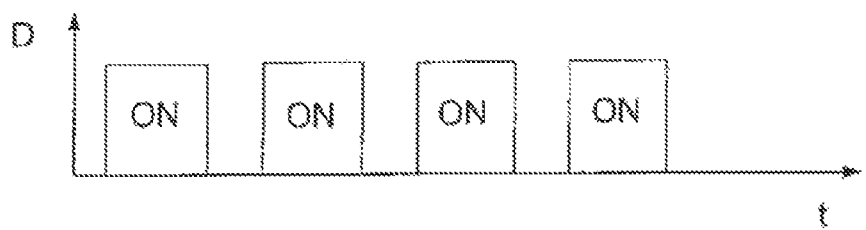
Figure 4D:
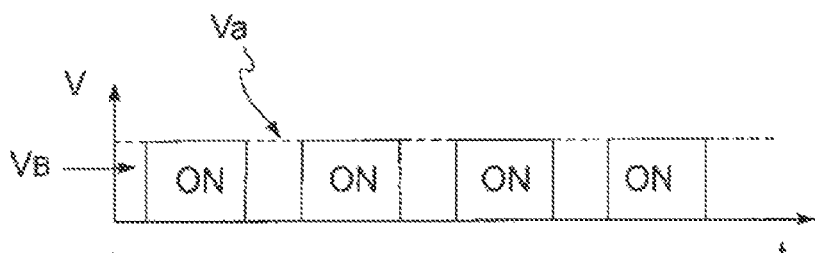
FIG. 4D shows by way of example, against time, waveforms of voltage signals relative to the components unit of FIG. 3 in a continuous conduction mode.
Figure 4E:
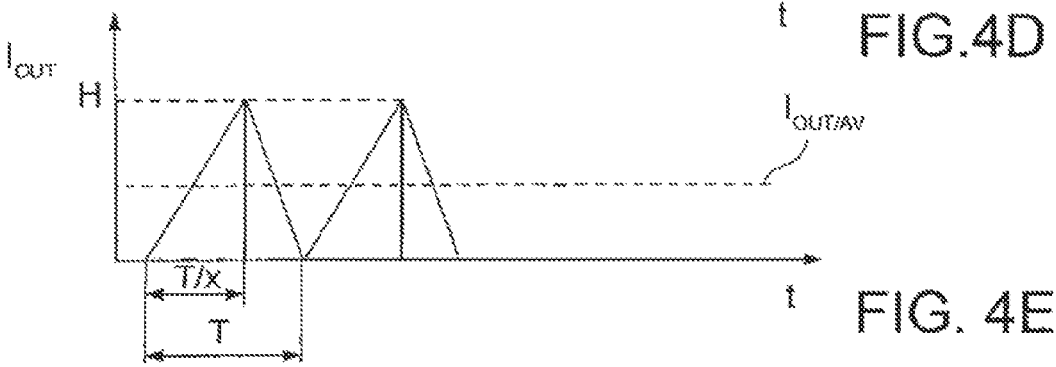
FIG. 4E shows a detail of two successive periods of the waveform of FIG. 4A.

The third switch S3 is closure/opening controlled based on the duty-cycle signal D of FIG. 4C, that is, such third switch S3 is closed (ON STATE) during the time intervals when the duty-cycle signal D has a high value (1 logic) to connect the converter 301 output terminal A to the filter 302 input terminal B. Instead, the third switch S3 remains open (OFF STATE) in the time intervals when the duty-cycle signal D has a low value (0 logic).

Vice versa, as regards the fourth switch S4, the latter is open (OFF STATE) in the time intervals when the duty-cycle signal D is high, while it is closed (ON STATE) in the time intervals when the duty-cycle signal D is low, thereby to connect the filter 302 terminal input B to the ground potential GND.

Accordingly, a voltage $V_B$ which is applied to the filter 302 input terminal B is such that: $V_B = V_A$ during the ON STATE time intervals of the duty cycle D; $V_B = 0$ during the OFF STATE time intervals of the duty cycle D. Such voltage $V_B$ has a pulsed trend, which is shown in FIG. 4D (solid line).

Advantageously, the waveform of the voltage $V_B$ which is present on the second terminal B of the block 205 is indicative of the values taken by the input current $I_{IN}$ of the DC-DC converter 200. This is inferred by analyzing FIG. 4E, which shows in detail two successive periods of the waveform of the battery 101 charge current $I_{OUT}$. Particularly, in FIG. 4E a peak value of the above-mentioned current $I_{OUT}$ is indicated with H, and $I_{OUT/AV}$ represents the average charge current. Furthermore, indicating with T a complete period of closure/opening of the third S3 and fourth S4 switches, T/X being the duty cycle, and $V_{ref}$ being the reference voltage, in the step-down DC-DC converter 200, the input current $I_{IN}$ and the charge current $I_{OUT}$ of the battery 101 can be expressed as:

$$I_{IN} = \frac{1}{2} \cdot \frac{1}{X} \cdot H \qquad (2)$$

$$I_{OUT} = \frac{1}{2} \cdot H$$

Furthermore, the following proportion is true:

$$V_{ref} : I_{IN} = V_A : I_{OUT}$$

$$V_A = \frac{V_{ref} \cdot I_{OUT}}{I_{IN}}$$

Then, on the basis of (2), the voltage at the first terminal A can be expressed as, $$V_A = V_{ref} \cdot X$$

While the voltage at the second terminal B $$V_B = V_A \cdot \frac{1}{X} + 0 \cdot \left(1 - \frac{1}{X}\right) \qquad (3)$$

$$V_B = V_{ref} \cdot X \cdot \frac{1}{X}$$

$$V_B = V_{ref}$$

From the latter of the previous equations (3), it is inferred that, in the continuous functioning mode, the feedbacked step-down DC-DC converter 200 operates so that, under stationary conditions, the voltage which is present at the filter 302 input terminal B takes the same value as the reference voltage $V_{ref}$. Such reference voltage $V_{ref}$ value is preset on the basis of the maximum value of the average input current $I_{IN/AV}$ to the converter 200 that it is desired to be controlled.

In operative terms, in the case where such average input current $I_{IN/AV}$ exceeds the pre-established maximum value, this causes a resultant increase of the battery 101 average charge current $I_{OUT/AV}$. Such current increase, detected by the sense resistor 204, causes a resultant voltage $V_A$ increase at the first terminal A and, by way of summary, a voltage $V_B$ increase at the second terminal B.

If the voltage $V_B$ exceeds the reference voltage $V_{ref}$ value, the integrator circuit 304 generates an integrated signal at the integrator 304 output terminal U having a lower level than that that would be generated under stationary conditions on the basis of the equation between $V_B$ and $V_{ref}$. The comparison between the above-mentioned integrated signal and the sawtooth signal produced by the generator 307 generates the first signal PWM PW1 having, in this case, a lower duty cycle than the one that such signal PW1 would have under stationary conditions.

Then, such first signal PW1 is compared by the logic block 207 to the second signal PWM PW2 generated by the second block 206. It shall be noted that the second pulse-width modulated signal PW2 is indicative only of the average charge current $I_{OUT/AV}$ of the battery 101. Particularly, the second signal PW2 duty cycle decreases/increases after an increase/decrease of the battery 101 charge current $I_{OUT}$.

The logic block 207 selects and sends as the control signal S the one, between such first PW1 and second PW2 PWM signals, having a lower duty cycle. In any case, a feedback signal S is sent to the control block DV which is adapted to reduce the time intervals in which the first switch S1 is closed and the second switch S2 is open relative to the stationary conditions. In such a way, the average value of the input current $I_{IN/AV}$ is reduced, and the input current $I_{IN}$ is adjusted.

Similar considerations also apply when the voltage $V_B$ results to be lower than the reference voltage $V_{ref}$. In this case, the adjustment function performed by the first block 205 makes it so that the integrator circuit 304 generates an integrated signal at integrator 304 output terminal U, having a higher level than that generated under stationary conditions. The above-mentioned integrated signal, when compared to the sawtooth signal produced by the generator 307, generates the first signal PW1 PWM having, this time, a higher duty cycle than the one that would be generated under stationary conditions. On the basis of the comparison between the first PW1 and the second PW2 signals PWM, the logic block 207 sends the control signal S to the control block DV.

Therefore, on the basis of the adjustment of the reference voltage $V_{ref}$ value, the DC-DC converter 200 of the invention allows controlling the average input current $I_{IN/AV}$ value even when only a piece of information about the average value of the battery 101 charge current $I_{OUT/AV}$ is available.

A functioning example of the step-down DC-DC converter 200 of the invention in the discontinuous conduction mode can be described with reference to FIGS. 5A-5D.

In this case also, a constant voltage $V_A$ connected to the battery 101 average charge current $I_{OUT/AV}$ is present at the converter 301 output terminal A on the basis of the relationship (1). Such constant voltage $V_A$ is shown in FIG. 5C (dashed line).

In the discontinuous mode, the third switch S3 is closure/opening controlled on the basis of the duty-cycle signal D1 shown in FIG. 5B. Such third switch S3 is closed (ON STATE) during the time intervals in which the signal D1 is high (ON), in order to connect the converter 301 output terminal A to the filter 302 input terminal B. The third switch S3 remains open (OFF STATE) both during a first time interval (OFF1) and during a second time interval (OFF2) in which the signal D1 is low.

With reference to the fourth switch S4, the latter one is opened (OFF STATE) in the time intervals in which the signal D1 is high. The fourth switch S4 is closed (ON STATE) in the first time interval (OFF1) in which the signal D1 is low, in order to connect the filter 302 second input terminal B to the ground potential GND. Finally, such fourth switch S4 returns to be open during the second interval (OFF2) in which D1 is low.

Accordingly, a voltage $V_B$ which is applied to the filter 302 input terminal B is such that $V_B=V_A$ during the time intervals in which the duty cycle D1 is high (ON STATE), $V_B=0$ during the first time interval in which D1 is low (OFF1). Finally, $V_B=V_{ref}$ during the second time interval (OFF2) in which D1 is low. Such voltage $V_B$ has a stepped trend, shown in FIG. 5C (solid line).

FIG. 5D shows in detail two successive periods of the waveform of the battery 101 charge current $I_{OUT}$. Particularly, in such FIG. 5D, a peak value of said current $I_{OUT}$ is indicated with H, and $I_{OUT/AV}$ represents the average charge current. Furthermore, by indicating with T a complete closure/opening period of the third S3 and of the fourth S4 switches, with T/X the time interval ON STATE, with T/Y the first time interval OFF1, with T-T/Y the second time interval OFF2, and with $V_{ref}$ the reference voltage, in the DC-DC converter 200, the battery 101 input current $I_{IN}$ and the charge current $I_{OUT}$ can be expressed as:

$$I_{IN} = \frac{1}{2} \cdot \frac{1}{X} \cdot H \qquad (4)$$

$$I_{OUT} = \frac{1}{2} \cdot \frac{1}{Y} \cdot H$$

Furthermore, the following proportion is true:

$$V_{ref} \cdot I_{IN} = V_A \cdot I_{OUT}$$

Then, on the basis of (4), the voltage at the first terminal A can be expressed as, $$V_A = V_{ref} \cdot \frac{X}{Y}$$

while the voltage at the second terminal B is $$V_B = V_A \cdot \frac{1}{X} + 0 \cdot \left(\frac{1}{Y} - \frac{1}{X}\right) + V_{ref} \cdot \left(1 - \frac{1}{Y}\right) \qquad (5)$$

$$V_B = V_{ref} \cdot \frac{X}{Y} \cdot \frac{1}{X} + V_{ref} \cdot \left(1 - \frac{1}{Y}\right)$$

$$V_B = V_{ref}$$

Also in the discontinuous functioning mode, from the last one of the previous equations (5), it can be inferred that the feed-backed step-down DC-DC converter 200 operates so that, under stationary conditions, the voltage which is present at the low pass filter 302 input terminal B takes the same value of the reference voltage $V_{ref}$.

Since the second terminal B contains the information about the input current $I_{IN}$, by fixing the reference voltage $V_{ref}$, it is possible to adjust such input current $I_{IN}$.

The exemplary step-down DC-DC converter 200 of the invention advantageously allows adjusting and reducing the input current $I_{IN}$ by using only one sense resistor 204. Such resistor 204 allows at the same time to accurately detect both input current $I_{IN}$ variations and charge current $I_{OUT}$ variations.

The DC-DC converter 200 has the advantage to require a minimal number of discrete circuitry components (particularly, only one sense resistor) that cannot be integrated. Therefore, such converter 200 has reduced overall dimensions compared to the known solutions, thereby resulting to be particularly adapted to be employed in portable electronic devices.

Furthermore, such minimal number of discrete circuitry components also implies a reduced power dissipation of the converter 200 compared to the devices of the known type.

To the above-described embodiments of the DC-DC converter, those of ordinary skill in the art, in order to meet contingent needs, will be able to make modifications, adaptations, and replacements of elements with functionally equivalent other ones, without departing from the scope of the following claims. Each of the characteristics described as belonging to a possible embodiment can be implemented independently from the other embodiments described.

The invention claimed is:

1. An electronic device comprising:
    a DC-DC converter adapted to control a supply current (IIN) provided to a battery to be recharged in the electronic device, the DC-DC converter comprising:
    an electrical input adapted to receive the supply current (IIN);
    an electrical output terminal connected to the battery through a coil and a sense resistor in series therebetween;
    a controllable selector adapted to connect the input terminal to the output terminal during a first time interval (ON) in order to transfer the supply current (IIN) to the battery and to connect the input terminal to a reference potential (GND) during a successive second time interval (OFF); and
    a feedback module adapted to generate a control signal for the controllable selector, the feedback module accepting a feedback signal originating at the sense resistor, the feedback signal being a voltage signal indicative of a variation of a battery charge current (IOUT), the feedback module comprising a first electronic block adapted to receive and processes the feedback signal to obtain a first variation information about the supply current (IIN) and produce a first pulse-width modulation signal, the first electronic block comprising:
        a converter configured to receive the feedback signal and produce a first output voltage signal;
        a filter having a filter input and filter output;
        a logical controllable selector adapted to selectively connect and disconnect the filter input and the converter's first output voltage signal;
        an integrator connected to the filter output, the integrator further configured to receive a reference signal and produce an integrator output; and
        an operational amplifier connected to receive the integrator output at an inverting input and a sawtooth wave signal at a non-inverting input, the operational amplifier providing the first pulse-width modulated (PWM) signal;
    wherein the feedback module is further adapted to use the first variation information to generate the control signal for the controllable selector so as to adjust a duration of said first connection time interval (ON) between the input terminal and the output terminal in response to a change in the supply current ($I_{IN}$).

2. The electronic device according to claim 1, wherein the logical controllable selector comprises a first controlled switch and a second controlled switch adapted selectively connect and disconnect the filter input and the converter's first output voltage signal.

3. The electronic device according to claim 2, wherein the logical controllable selector is configured to directly connect the converter output voltage signal to the filter input during a first activation time interval wherein the first controlled switch is effectively closed, and adapted to connect the filter input to the reference potential (GND) during a second activation time interval wherein the second controlled switch is effectively closed.

4. The electronic device according to claim 1, wherein the converter is adapted to provide the first voltage signal comprising a width proportional to the feedback signal at the output terminal.

5. The electronic device according to claim 4, wherein the integrator compares the filter output, during said first activation time interval, with the voltage reference signal in order to produce the integrator output.

6. The electronic device according to claim 5, the operational amplifier, during said first activation time interval, compares the integrator output to the sawtooth voltage signal in order to provide the first pulse-width modulated signal.

7. The electronic device according to claim 6, wherein said first pulse-width modulated signal has a first duty cycle that is less than a stationary condition duty cycle, when the first output voltage signal is made available at the filter input and exceeds the value of the reference voltage.

8. The electronic device according to claim 1, wherein the feedback module further comprises a second electronic block adapted to receive and process the feedback signal to obtain a second variation information indicative of the average charge current of the battery and produce a second pulse-width modulation signal which varies with respect to the battery charge current ($I_{OUT}$).

9. The electronic device according to claim 8, wherein the feedback module further comprises a logic block connected to receive the first and second pulse-width modulation signals, the logic block being adapted to select, between the first and second pulse-width modulation signals, the pulse-width modulation signal having a lowest duty cycle.

10. The electronic device according to claim 1, wherein the DC-DC converter is a step-down converter.

11. The electronic device according to claim 1, wherein the battery is a rechargeable battery and the supply current ($I_{IN}$) is provided from a USB connector, the rechargeable battery being connected to the USB connector through the electrical input of the DC-DC converter.

12. The electronic device in accordance with claim 1, wherein said electronic device is at least one of a mobile phone, palm device (Personal Digital Assistant), portable MP3 player, digital camera, digital video camera and a portable computer.

13. An electronic device comprising:
    a DC-DC converter adapted to control a supply current (IIN) provided to a battery to be recharged in the electronic device, the DC-DC converter comprising:
        an electrical input adapted to receive the supply current (IIN);
        an electrical output terminal connected to the battery through a coil and a sense resistor in series therebetween;
        a controllable selector adapted to connect the input terminal to the output terminal during a first time interval (ON) in order to transfer the supply current (IIN) to the battery and to connect the input terminal to a reference potential (GND) during a successive second time interval (OFF); and
        a feedback module adapted to generate a control signal for the controllable selector, the feedback module accepting a feedback signal originating at the sense resistor, the feedback signal being a voltage signal indicative of a variation of a battery charge current (IOUT), the feedback module comprising a first electronic block configured to receive and processes the feedback signal to obtain a first variation information about the supply current (IIN) and produce a first pulse-width modulation signal, the first electronic block comprising:

a three stage controllable selector adapted to selectively enable the first electronic block to provide the control signal generated from one of the voltage signal, a floating input, or a grounded input;

wherein the feedback module is further adapted to use the first variation information to generate the control signal for the controllable selector so as to adjust a duration of said first connection time interval (ON) between the input terminal and the output terminal in response to a change in the supply current ($I_{IN}$).

14. The electronic device according to claim 13, wherein the feedback module further comprises a second electronic block adapted to receive and process the feedback signal to obtain a second variation information indicative of the average charge current of the battery and produce a second pulse-width modulation signal which varies with respect to the battery charge current ($I_{OUT}$).

15. The electronic device according to claim 13, wherein the feedback module further comprises a logic block connected to receive the first and second pulse-width modulation signals, the logic block being adapted to select, between the first and second pulse-width modulation signals, the pulse-width modulation signal having a lowest duty cycle.

16. The electronic device according to claim 13, wherein the DC-DC converter is a step-down converter.

17. The electronic device according to claim 13, wherein the battery is a rechargeable battery and the supply current ($I_{IN}$) is provided from a USB connector, the rechargeable battery being connected to the USB connector through the electrical input of the DC-DC converter.

18. The electronic device in accordance with claim 13, wherein said electronic device is at least one of a mobile phone, palm device (Personal Digital Assistant), portable MP3 player, digital camera, digital video camera and a portable computer.

\* \* \* \* \*